United States Patent

Nagakubo et al.

Patent Number: 5,904,860
Date of Patent: May 18, 1999

[54] METHOD FOR DIRECT BONDING NITRIDE BODIES

[75] Inventors: Masao Nagakubo, Nishikamo-gun; Harumi Suzuki, Kariya; Takashi Kurahashi, Okazaki, all of Japan

[73] Assignee: Nippondenso Co., Ltd., Kariya, Japan

[21] Appl. No.: 08/713,033

[22] Filed: Sep. 12, 1996

[30] Foreign Application Priority Data

Sep. 12, 1995 [JP] Japan .................................. 7-260895

[51] Int. Cl.$^6$ .................................................. C03C 15/00
[52] U.S. Cl. ........................ 216/34; 156/272.2; 156/379.6
[58] Field of Search .................................. 216/84, 643.1, 216/34; 156/272.2, 379.6

[56] References Cited

U.S. PATENT DOCUMENTS

| | | | |
|---|---|---|---|
| 4,866,003 | 9/1989 | Yokoi et al. | 437/40 |
| 5,100,839 | 3/1992 | Terao . | |
| 5,421,953 | 6/1995 | Nagakubo et al. . | |
| 5,451,547 | 9/1995 | Himi et al. | 437/225 |
| 5,503,704 | 4/1996 | Bower et al. | 156/281 |

OTHER PUBLICATIONS

Diffusion Bonding Ceramics to Metals, Takemi Yamada et al, Steel Research Center and Advanced Technology Research Center, NKK Corporation, pp. 117–125.

*Primary Examiner*—Donna C. Wortman
*Assistant Examiner*—Brenda G. Brumback
*Attorney, Agent, or Firm*—Pillsbury Madison & Sutro LLP

[57] ABSTRACT

Nitrogen atoms on the surface of a first body are terminated by hydrogen atoms after the surfaces of the first body and a second body to which it is to be bonded are cleaned. The surface of the first body terminated by the hydrogen atoms and the surface of the second body are bonded to each other so that hydrogen bonds are formed between the nitrogen atoms and the bonded hydrogen atoms on the surface of the first body and the atoms on the surface of the second body. Using these hydrogen bonds, the surface of the first body and the surface of the second body are strongly bonded to each other. When the surface of the second body is formed with nitride or oxide, strong hydrogen bonds of N—H ⋯ N or N—H ⋯ O are formed between the first body and the second body. Thus, the method does not require bonding under high temperature or high pressure.

17 Claims, 4 Drawing Sheets

METHOD FOR DIRECT BONDING NITRIDE BODIES

CROSS-REFERENCE TO RELATED APPLICATION

The present application is related to and claims priority from Japanese Patent Application No. Hei 7-260895, incorporated herein by reference.

BACKGROUND OF THE INVENTION

1. Field of the Invention

The present invention relates to method for direct bonding a member having nitride surface to another member having a nitride or oxide surface. For the first member, a non-nitride member having its surface covered with nitride or a member entirely made of nitride can be used. As the other member, a member having its surface covered with nitride or oxide, a member entirely made of nitride or oxide, metal, a semiconductor material, ceramic, a polymeric compound or the like can be used. The direct bonding method is used to form a bond between a base and IC chips or sensors which have surfaces covered with a protective film such as $Si_3N_4$ or TiN. Further, the direct bonding method is used for precisely bonding base to another member such as a super-hard member, a super-heat resisting member or the like.

2. Description of Related Art

A conventional method for direct bonding of two materials is disclosed in Japanese Unexamined Patent Publication No. hei 6-302486. In the conventional direct bonding method, hydroxide groups are chemically adsorbed on the surface of a member in a vacuum atmosphere, then two members are pressed together tightly so that two materials are directly bonded through the use of hydrogen bonds between the surfaces of the two members.

However, in the above-described method, it is necessary to adsorb hydroxide groups to the surface of one bonding member, that is, it is a necessary condition that the surface can be oxidized. Because nitride does not adsorb hydroxide groups, a nitride member or a member covering the surface with nitride is not used as a member for adsorbing hydroxide groups. Thus, it is impossible to form a bond between two members having a nitride body or nitride cover film on the surface, or between such a nitride member and another member such as a metal and semiconductor member without adsorbing hydroxide groups.

As a conventional method of bonding nitride and metal, metal atoms are driven into the surface of a nitride member at a high energy so that the surface of nitride is metallized. Then, the nitride and metal are compressed at a high pressure of above 100 MPa to tightly contact one another, or an insert member which conforms to both bonding members is sandwiched between the nitride member and the metal member, and the two bonding materials are pressed together at a high temperature.

As described above, the conventional method does not directly bond between the nitride members or between the nitride member and a non-metal member. Further, in the bonding method of nitride and metal, the metal for bonding must have good ductility, the method requires a high temperature of direct lower melting point and a high pressure of above 100 MPa.

Thus, in the above-described bonding methods, the size and the shape of bonding member and bonding precision have limits. Particularly, when metal and a member which is made with nitride material having a complex shape at the microscopic level are bonded, deformations and cracks are generated in this member after bonding so that the method cannot be used for precise bonding.

SUMMARY OF THE INVENTION

In view of the foregoing problems of the prior art, it is an object of the present invention to provide a method for direct bonding two bodies in a low temperature and low pressure environment where one bonding body is made of nitride or its surface is covered with a nitride film. Hereinafter, such bodies will be referred to as "nitride bodies".

The above object is achieved according to an aspect of the present invention by providing a method in which the surfaces of a first body and a second body are cleaned. Then, nitrogen atoms on the surface of the first body are terminated by hydrogen atoms. Thus, dangling bonds of the nitrogen atoms are bonded with hydrogen atoms, and amino groups ($-NH_2$) are chemically adsorbed onto the surface of the nitride body. Then, the surface of the first body having a surface terminated by hydrogen atoms and the surface of the second body are bonded to each other. Thus, hydrogen atoms bonded with nitrogen atoms on the surface of the first body are bonded with atoms on the surface of the second body. Using the hydrogen bonds, the surface of the first body and the surface of the second body are strongly bonded to each other. Further, when the surface of the second body is formed with nitride or oxide, strong hydrogen bonds of N—H - - - N or N—H - - - O are formed between the first body and the second body. The surface of the second body need be not terminated with hydrogen atoms. Because of the strong hydrogen bonds, the present invention does not require a high temperature or a high pressure.

According to this aspect of the present invention, when nitrogen atoms on the surface of the first body are terminated with hydrogen atoms and the terminated state is maintained, an adsorbed water molecules layer is easily formed on the surface of the body. Thus, in this case, the water molecules are removed and the surface terminated with hydrogen atoms is bonded with the surface of the other body. The removing of the water molecules may be performed before bonding the first body and the second body or after bonding. By removing water molecules, two bodies can be strongly bonded to each other.

Preferably, the method of the present invention realizes a reliable bonding at relatively low temperature and low pressure; therefore, a nitride body having a microscopically complex shape can be precisely directly bonded with another body without generating deformations or cracks, so that a bit for precise working can be manufactured.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

A preferred embodiment of the present invention is described hereinafter with reference to the accompanying drawings.

Figure 1:
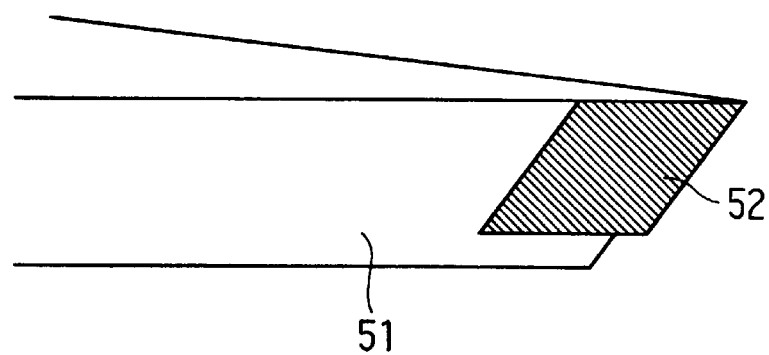
FIG. 1 is a perspective view showing a precise working bit formed according to the method of the embodiment of the present invention.

In FIG. 1, a direct bonding method according to an embodiment of the present invention is applied to a formation of a bit for precise working.

Because nitride such as boron nitride and titanium nitride has a super-high hardness, a film formed from this nitride is disposed on the surface of a cutting tool so that the life of the tool is extended. However, in the conventional method, when the tool as a base material has a microscopically complex shape, the thickness of the bonded membrane becomes non-uniform, or the adhesion of the membrane with the base material is not sufficient.

According to the bonding method of the present invention, because a cutting edge 52 (shown in FIG. 1) of nitride can be directly bonded to an end of a tool 51, even though the shape of the tool is complex, the strength of the tool does not depend on the base material so that devices produced using the present invention have high reliability. Further, compared to a conventional bonding method such as compression or diffusion, the bonding method according to this invention can directly bond at a low temperature and a low pressure so that a micro-tool such as a cutting bit can be bonded without damaging the precision shape of the device.

A bonding apparatus according to this embodiment is described with reference to FIGS. 2 and 3. In the bonding apparatus, a vacuum chamber 11 is evacuated to about $10^{-4}$ Pa through a port 16 by a vacuum pump (not shown). A contacting holder 12 is provided in the right portion of the vacuum chamber 11. As shown in FIG. 3, the contacting holder 12 includes arm portions 12A and a joint portion 12B. The arm portions 12A can hold first body 13 and second body 14 to be bonded with surfaces of the bodies 13 and 14 which have been preliminarily mirror polished being exposed. The joint portion 12B is rotatably connected to the arm portion 12A. When the arm portions 12A are rotated by the joint portion 12B, the surfaces of the first body 13 and the second body 14 to be bonded can be brought into parallel contact with each other. This operation of rotation is performed by means of an operational lever 12C from the exterior of the vacuum chamber 11. Using the operational lever 12C, the load applied to the surface of the first body 13 and the second body 14 can be controlled.

An ion source 21 is provided in the upper portion of the vacuum chamber 11, and the surfaces of the first body 13 and the second body 14 are ion etched and cleaned using this ion source 21. An inert gas such as argon is introduced into the ion source 21 through a unit 23 for supplying an inert gas.

An ECR (electron cyclotron resonance) type plasma generating source 31 is provided in the left portion of the vacuum chamber 11. The ECR-type plasma generating source 31 includes an ionizing chamber communicating with the vacuum chamber 11 and an electromagnetic coil 33 for generating a magnetic field in the ionization chamber 32. Microwaves generated in a magnetron (not shown) are introduced into the ionizing chamber 32 through a waveguide in the direction of the arrow.

The ionizing chamber 32 is connected to the inert gas supply unit 23 for supplying an inert gas as a discharging gas and to reactive gas supply units 34 and 35 for supplying reactive gases such as hydrogen and ammonia, by which the respective gases can be supplied to the ionizing chamber 32. The introduced gas mixture is excited and ionized in the ionizing chamber 32 by the microwave discharge to generate plasma. Here, the frequency of the microwaves introduced into the ionizing chamber 32 coincides with the cyclotron resonance frequency of electrons determined by the magnetic field of the electromagnetic coil 33, by which the electrons in the gaseous molecules are resonantly accelerated so that the gaseous molecules are excited and ionized to generate plasma.

Next, the method for direct bonding two bodies by using the above apparatus is described with reference to FIGS. 4A–4D.

First, the first nitride body 13 including the cutting edge 52 of the tool 51 and the second body 14 of base metal of the tool are preliminarily mirror polished. As described above, the first body 13 and the second body 14 are arranged in the arm portions 12A of the contacting holder 12. In this example, the surface of the second body 14 has an oxide film disposed thereon. As noted above, the contacting holder 12 for holding these bodies 13 and 14 is located in the vacuum chamber 11.

Figure 4A:
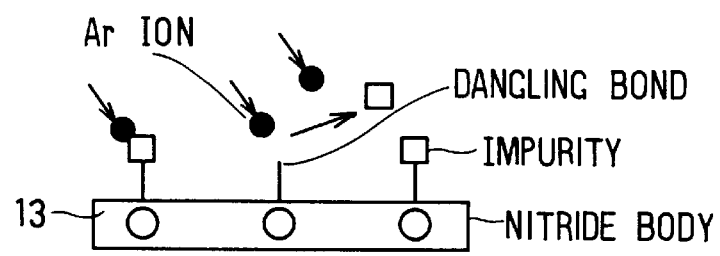
FIGS. 4A–4D and 5 schematically show hydrogen bonds according to the embodiment.

Next, argon gas is supplied from the inert gas supplying unit 23 and by operating the ionizing source 21, the argon gas is ionized and applied as an ion beam 22 having a certain energy to the surfaces of the first body 13 and the second body 14. The ion energy is set at as a low level as possible so as not to reduce the smoothness of the surface of the bodies, for example, 100 to 200 eV, and the time period for etching is set as long as necessary to remove surface layers about 10 nm thick from the first body 13 and the second body 14. In this step, many dangling bonds of nitrogen atoms are created on the surface of the first body 13 as shown in FIG. 4A. If the cleaned bodies are left alone for a while after the cleaning step, even if the vacuum chamber 11 is maintained under a high vacuum, impurities such as nitrogen, carbon and hydrocarbons are chemically adsorbed on the cleaned surface of the first body 13 and the second body 14 and the cleaned surfaces become deactivated, since these dangling bonds are very active. Accordingly, termination of dangling bonds using hydrogen atoms is started before the cleaning step finishes.

Figure 2:
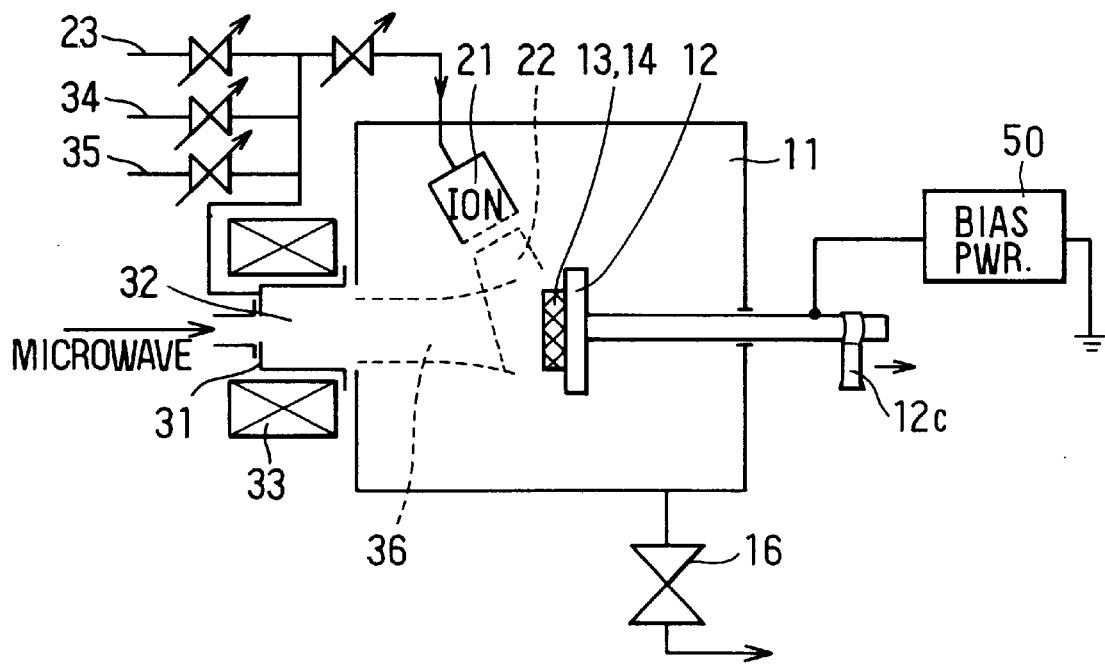
FIG. 2 is a schematic diagram showing a bonding device according to a preferred embodiment of the present invention.
Figure 3:
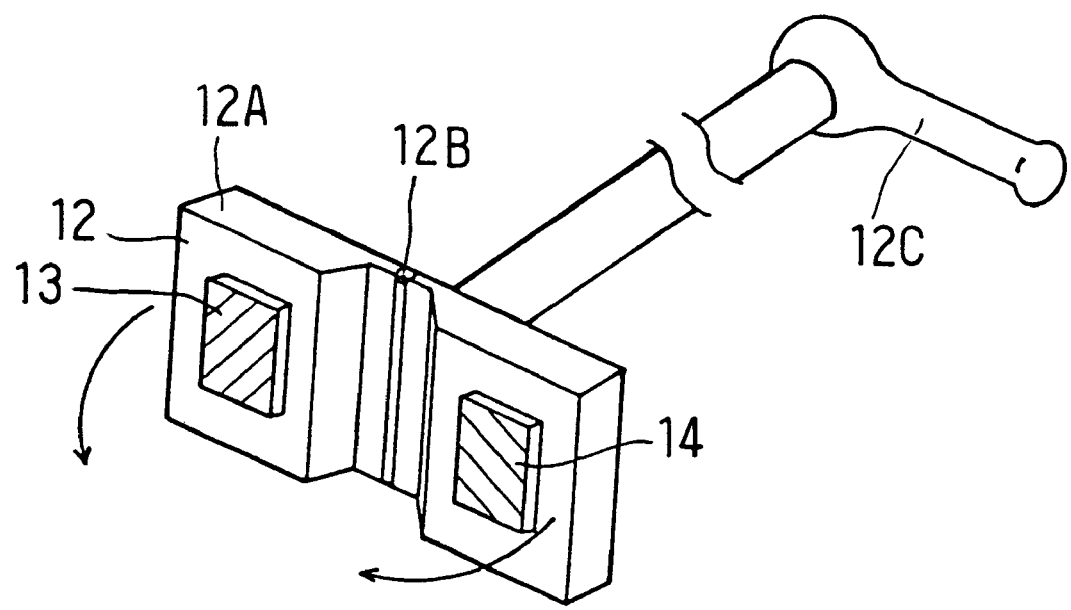
FIG. 3 is a perspective view showing a bonding holder used in a bonding device according to the embodiment.
Figure 4B:
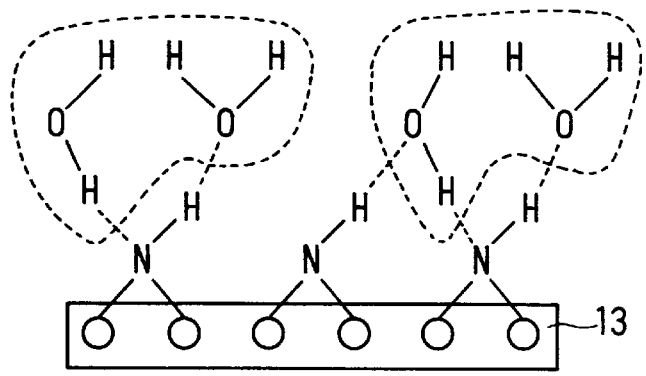
Figure 4C:
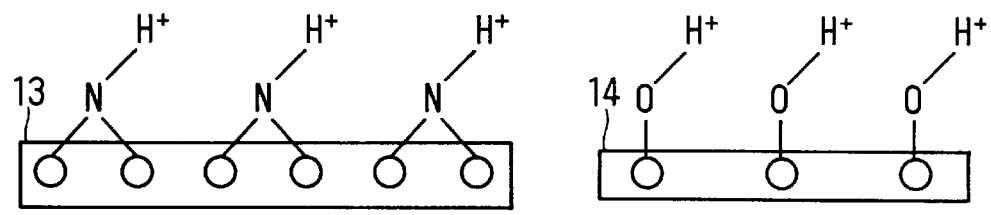

Referring to FIG. 2, hydrogen gas is next supplied from the reactive gas supply means 34 and microwaves are supplied to the ionizing chamber 32 by operating the electromagnetic coil 33 so that a plasma of hydrogen gas generated in the ionizing chamber 32 is injected as a plasma beam 36 through the opening of the ionizing chamber 32 toward the first nitride body 13 and the second body 14 in the vacuum chamber 11. Thus, the dangling bonds of nitrogen atoms on the surface of the first body 13 are terminated with hydrogen atoms. Further, dangling bonds of oxygen atoms on the surface of the second body 14 are terminated with hydrogen atoms. The energy of the plasma beam 36 is not high enough to significantly raise the temperature of the first body 13 or the second body 14, for example, the energy is about 10 eV. Accordingly, as shown in FIG. 4C, nitrogen atoms on the surface of the first body 13 are terminated with hydrogen atoms, oxygen atoms on the surface of the second body 14 are terminated with hydrogen atoms.

Figure 4D:
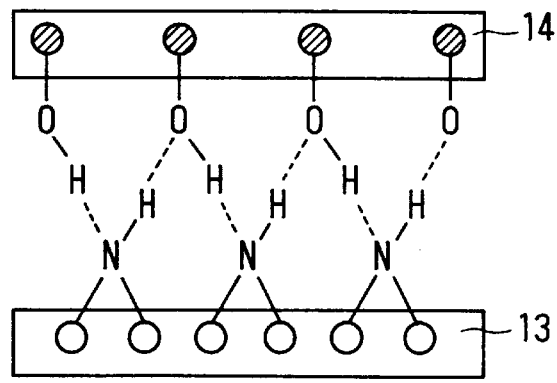
Figure 6:
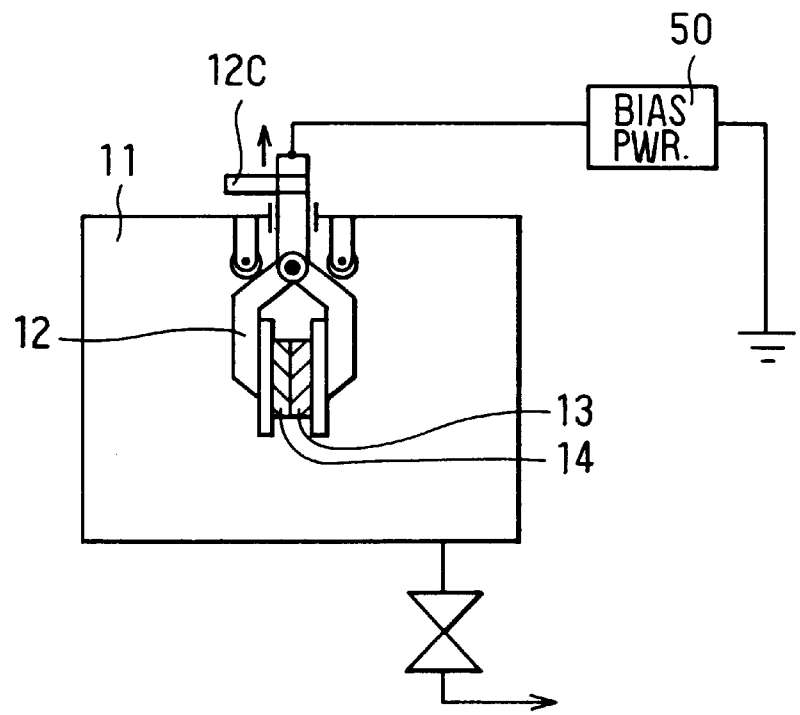
FIG. 6 shows a technique for bonding two bodies using the bonding holder.

Next, the bonding step is conducted while the activity of the hydrogen atoms adsorbed on the surfaces to be bonded of the first body 13 and the second body 14 is maintained. That is, the contacting holder 12 is operated by means of a lever 12C from outside of the vacuum chamber 11 so that the bonding surfaces of the first body 13 and second body 14 contact each other as shown in FIG. 6. As a result, as shown in FIG. 4D, hydrogen bonds of N—H ⁻ ⁻ ⁻ O are formed between hydrogen atoms of the NH groups on the surface of the first body 13 and oxygen atoms on the surface of the second body 14, or hydrogen bonds of O—H ⁻ ⁻ ⁻ N are formed between hydrogen atoms of hydroxide groups on the surface of the second body 14 and nitrogen atoms on the surface of the first body 13. With the formation of these hydrogen bonds, a strong bonding of the first body 13 and second body 14 is completed.

If the surfaces of the first body 13 and the second body 14 are previously made sufficiently smooth, a reliable bonding with a high bonding strength can be obtained under an extremely low pressing pressure, for example, about 0.5M Pa. This is because the density of the hydrogen bonds between hydrogen atoms and nitrogen atoms or oxygen atoms is increased as the contact between the two surfaces of the first body 13 and the second body 14 is made more intimate or precise.

In the cleaning step of the above-described embodiment, the ion etching of argon gas is used for cleaning the surfaces of the first body 13 and the second body 14. However, sputter etching can be used. When sputter etching is used, direct current power or radio frequency electromagnetic waves are supplied to the first body 13 and the second body 14 from a bias power source 50, by which the sputter etching of the surfaces of the first body 13 and the second body 14 is performed with the bodies 13 and 14 being used as a cathode.

In the above described embodiment, the termination process of nitrogen atoms on the surface of the first body 13 is performed using hydrogen gas plasma with an ECR device. However, other techniques may be used to generate hydrogen plasma as long as the reactive hydrogen radicals or hydrogen ions are generated at a high density. Further, even if the plasma is not generated, if the reactive hydrogen atoms irradiate the surface of the nitride body 13 with a certain energy, hydrogen atoms are chemically bonded to the nitrogen atoms exposed on the surface of the nitride body 13 so that the nitrogen atoms may be terminated. That is, it is sufficient that the surface state of FIG. 4C is generated.

Further, the termination of the surface of the nitride body 13 with hydrogen atoms may be performed by a wet process such as chemical etching with diluted HF.

Figure 5:
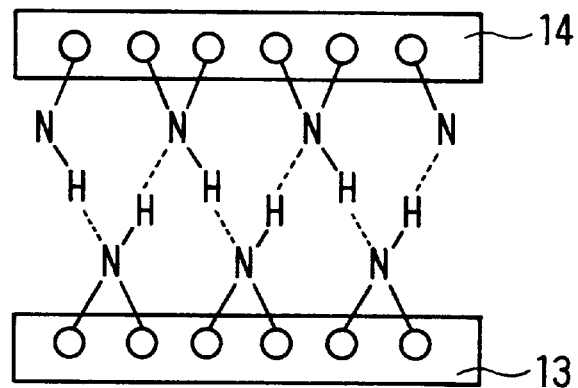

Further, when the surfaces of the first body 13 and the second body 14 are both nitride, hydrogen bonds of N—H ⁻ ⁻ ⁻ N are formed as shown in FIG. 5.

Further, when the surfaces of the first body 13 and the second body 14 are nitride, a surface chemical reaction of +$NH_x$ is generated on these surfaces so that nitrogen atoms of surfaces of the bodies may be terminated with hydrogen atoms. This process may use a wet process or a dry process. When the dry process is used, ammonia gas is supplied to the ionizing chamber 32 from the reactive gas supply means 35 so that $NH_x$ radicals are generated by a microwave discharge excitation and may be irradiated on the surface of the bodies 13 and 14.

In the above described termination process with hydrogen atoms, when the bonds of NH are exposed on the surface in the wet process or the dry process, hydrogen bonds are easily formed between the NH bonds and water molecules. Therefore, with hydrogen termination, water molecules are adsorbed to these hydrogen atoms as shown in FIG. 4B. Even if the dry process is used, when water molecules exist in the starting gas, the surface of the sample body is covered with a water layer in a short time.

When adsorbed water molecules stay on the bonding interface, the bonding strength greatly decreases. Therefore, before bonding the surfaces of the first body 13 and the second body 14 together, or after bonding, it is necessary to remove water molecules from the surface of the bodies or the bonding interface, respectively. As the method of bonding two bodies after removing water molecules on the surface, energy such as a heating process, microwaves or ultraviolet light may be applied to the surfaces of the bodies so that water molecules on the surface are removed by oxidation reaction with bodies. By maintaining a high vacuum, the two bodies are bonded while re-adsorption of water is prevented. Further, as the method of removing water molecules on the bonding interface after bonding the two bodies, the two bodies are bonded to each other, then energy such as a heating process, microwaves or ultraviolet lights may be applied to the bonding interface so that water molecules are removed by oxidation reaction with the bodies.

Using the above-described apparatus, microwaves are introduced into the vacuum chamber 11 through the plasma generating source 31 without generating plasma therein. As a result, the water molecules adsorbed on the surfaces of the first body 13 and the second body 14 are vigorously vibrated by the vibrating electric field caused by the microwaves so that the water molecules are removed.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for direct bonding a surface of a first body, at least said surface of said body being a nitride surface, to a surface of a second body, said method comprising the steps of:

cleaning the surfaces of the first body and the second body;

terminating bonds of nitrogen atoms on the surface of the first body by bonding the nitrogen atoms directly to hydrogen atoms; and bonding the surface of the first body to the surface of the second body through bonds of said hydrogen atoms.

2. A method according to claim 1, said bonding step comprising a step of removing water molecules adsorbed on the surface of the first body before bonding the surfaces of the first body and the second body.

3. A method according to claim 1, said bonding step comprising a step of removing water molecules adsorbed on the surface of the first body after bonding when water molecules are adsorbed onto the surfaces of the first body and the second body.

4. A method according to claim 1, wherein said cleaning step cleans the surfaces of the first body and the second body with a chemical solvent.

5. A method according to claim 1, wherein said cleaning step cleans the surfaces of the first body and the second body with a high energy beam.

6. A method according to claim 1, wherein said terminating step includes a step of chemical etching with diluted hydrofluoric acid.

7. A method according to claim 1, wherein said terminating step uses hydrogen plasma.

8. A method according to claim 7, wherein said terminating step terminates bonds of nitrogen atoms on the surface of the first body with hydrogen atoms generated by an electron cyclotron resonance plasma generating technique.

9. A method according to claim 7, wherein said terminating step terminates bonds of nitrogen atoms on the surface of the first body with hydrogen atoms generated by a radical beam source in a vacuum.

10. A method according to claim 1, wherein the surface of the second body is covered with nitride.

11. A method according to claim 10, further comprising the step of terminating the nitrogen atoms on the surface of the second body by bonding the nitrogen atoms to hydrogen atoms.

12. A method according to claim 10, further comprising the step of irradiating a gas containing hydrogen ions on the surfaces of the first body and the second body to terminate the nitrogen atoms thereon.

13. A method according to claim 10, further comprising the step of irradiating a gas containing hydrogen radicals on the surfaces of the first body and the second body to terminate the nitrogen atoms thereon.

14. A method according to claim 1, wherein the surface of the second body is covered with oxide.

15. A method according to claim 14, further comprising the step of terminating the oxygen atoms on the surface of the second body with hydrogen atoms.

16. A method according to claim 14, further comprising the step of irradiating a gas containing hydrogen ions on the surface of the first body to terminate the nitrogen atoms thereon.

17. A method according to claim 14, further comprising the step of irradiating a gas containing hydrogen radicals on the surfaces of the first body to terminate the nitrogen atoms thereon.

* * * * *